United States Patent [19]
Loyk

[11] 3,725,758
[45] Apr. 3, 1973

[54] AUTOMATIC FEEDBACK CLOSED LOOP SYSTEM FOR FORWARD SPEED CONTROL AND BRAKING CONTROL

[75] Inventor: Victor Loyk, Herndon, Va.

[73] Assignee: The United States of America as represented by the Secretary of the Navy

[22] Filed: June 1, 1971

[21] Appl. No.: 148,507

[52] U.S. Cl. ................................. 318/269, 318/369
[51] Int. Cl. .............................................. H02p 5/16
[58] Field of Search ....... 318/269, 302, 304, 366, 369

[56] References Cited

UNITED STATES PATENTS

| | | | |
|---|---|---|---|
| 3,599,764 | 8/1971 | Daab | 318/302 |
| 3,100,554 | 8/1963 | Doubek | 318/269 |
| 3,450,910 | 7/1969 | Jaeschke | 318/302 |
| 3,497,786 | 2/1970 | Lombardo | 318/269 |

Primary Examiner—Bernard A. Gilheany
Assistant Examiner—Thomas Langer
Attorney—R. S. Sciascia, Q. E. Hodges and J. L. Rosenblatt

[57] ABSTRACT

This invention controls a dynamo-electric device, such as a DC motor for running at a desired operating speed. The motor speed is maintained at the desired level by feeding back a tachometer voltage indicative of the motor speed, to an adder whose output provides a positive polarity error signal. The error signal is amplified in two channels: an under speed channel and an over speed channel. The under speed channel provides a signal to a motor current control device which supplies the current to the motor to maintain the motor speed. An over speed signal is applied across a charged capacitor. The over speed signal being less than the voltage indicating the set speed charge on the capacitor, the capacitor discharges generating an over speed signal. This over speed signal is then applied to a braking control device which controls a mechanical brake.

6 Claims, 1 Drawing Figure

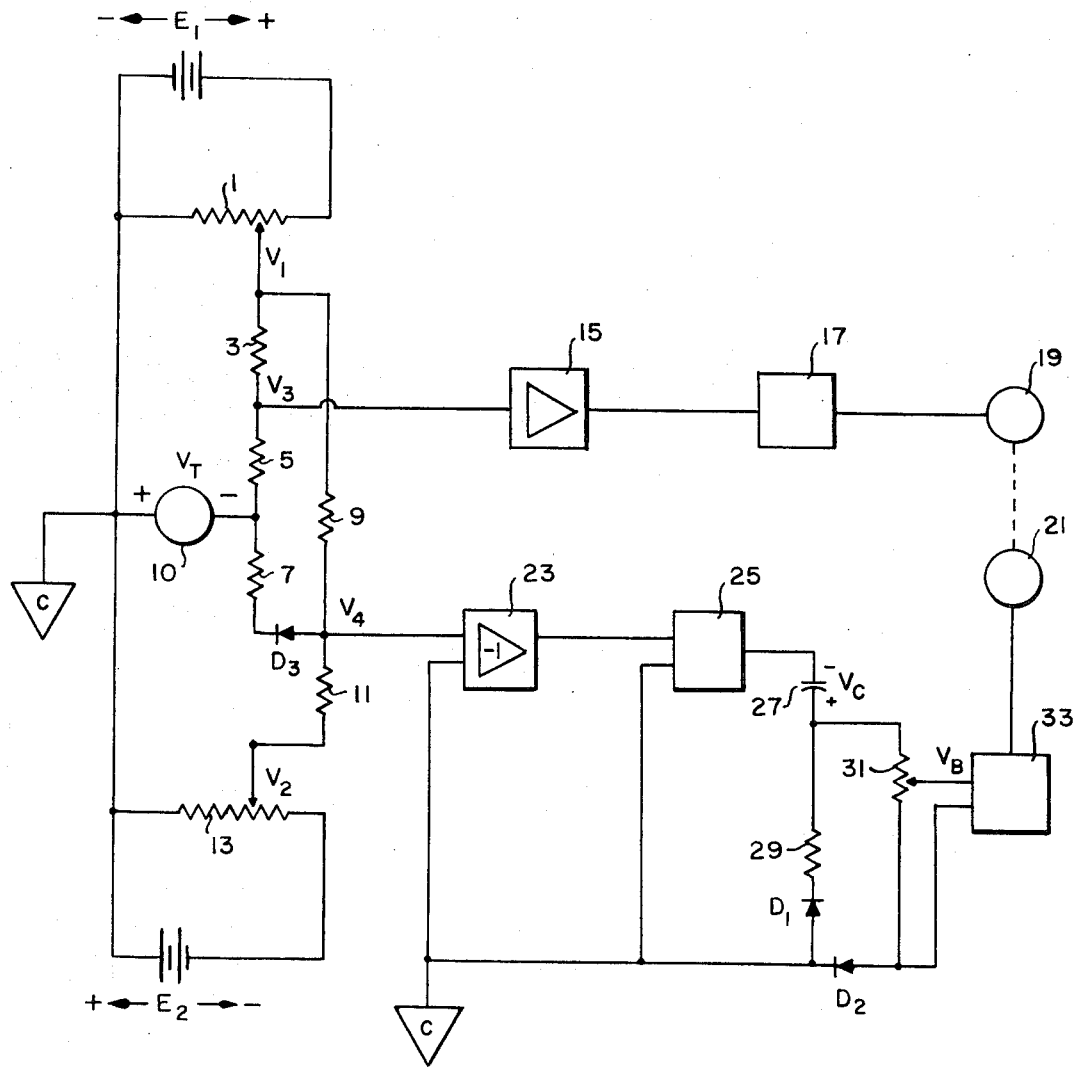

AUTOMATIC FEEDBACK CLOSED LOOP SYSTEM FOR FORWARD SPEED CONTROL AND BRAKING CONTROL

The invention described herein may be manufactured and used by or for the Government of the United States of America for Governmental purposes without the payment of any royalties thereon or therefor.

BACKGROUND OF THE INVENTION

Many systems for increasing the speed of a motor are present in the prior art. Most closed loop or feedback systems utilize the motor's inertia or friction or the back EMF of the motor to brake the motor in an over speed condition. Other devices generate positive and negative signals, corresponding to over and under speed conditions, which are processed to accordingly brake or increase the speed of the motor. These prior art devices either lack the combined capability of positively controlling a motor for over speed or they rely upon positive and negative polarity signals to control the motor speed. The use of the positive and negative polarity signals in the prior art devices introduces a potential for instability and the disadvantage of sensing minsule voltage differences when the motor is operating close to the desired speed.

SUMMARY OF THE INVENTION

This invention is a closed loop control system utilizing a positive reference input voltage corresponding to a desired motor speed and a negative tachometer output voltage corresponding to actual motor speed to provide instantaneous forward speed control and braking control signals. A tachometer mechanically coupled to the rotor of the motor generates a negative output signal corresponding to the actual speed of the motor. The positive reference voltage is combined with the negative tachometer output to produce a positive voltage value corresponding to the desired speed.

The motor speed error is indicated by the positive signal, varying about the desired positive voltage corresponding to the desired motor speed.

The positive output voltage is reduced when the motor is in an over speed condition and a greater negative polarity voltage is generated by the tachometer. The positive output voltage is increased when the motor is operating in an under speed condition corresponding to a lower or a decreased negative tachometer output. The positive output voltage is coupled to two operational amplifiers. The first oparational amplifier output is applied to a threshold device such as an SCR to control drive current to the motor and increase motor speed. At the same time the positive output is supplied to the second operational amplifier to increase the voltage charge across a capacitor. As the motor is brought up to the desired speed the positive error signal decreases and the speed signal reaches the predetermined voltage level corresponding to the desired motor speed. The charging capacitor then assumes a steady state charge voltage corresponding to the desired motor speed.

An increase in motor speed above the desired speed causes an increased negative tachometer output resulting in a lower positive output. This decreased positive output is applied across a second operational amplifier causing the capacitor to discharge towards the new lower voltage. The discharging capacitor generates a voltage in the discharge resistance which is then used as an over speed signal to control a braking device mechanically coupled the output voltage approaches the level corresponding to the desired speed and the charge across the capacitor increases approaching that capacitor voltage corresponding to the desired motor speed.

The advantage of this invention is that it uses an error signal of a positive polarity to control over speed and under speed conditions. It is not necessary for the error signal to go through zero before an over speed condition can be corrected. Consequently, if in a trial situation, a motor is running under speed and the control circuit commands the motor to speed up while, at the same time, motor load conditions decrease causing an almost instantaneous over speed condition in the motor, this circuit posses the capability to instantaneously generate proportional braking signal.

Accordingly, it is a first object of this invention to provide a motor control circuit for over speed and under speed conditions.

A second object of this invention is a motor control circuit which provides a braking signal instantaneously and proportional to the error between the motor over speed condition and the desired motor speed.

BRIEF DESCRIPTION OF THE DRAWING

A partial block diagram of the motor control system in schematic form is shown in the FIGURE.

Referring now to the FIGURE, the control circuit as described. A constant voltage source is formed by potentiometer 1 connected across voltage source $E_1$. The constant voltage level signal $V_1$ appears at the output of potentiometer 1. Similarly, potentiometer 13 is connected across the voltage source $E_2$ and constant voltage level signal $V_2$ appears at the output of potentiometer 13. Potentiometers 1 and 13 are ganged together so that movement of one potentiometer control causes a proportionate movement of the other. The voltage $V_1$ is positive with respect to ground while the voltage $V_2$ is negative with respect to ground. Resistances 3, 5, 7, 9 and 11 are connected as shown in the FIGURE and except for 9 are all of the same resistance value, with 9 being slightly less in value.

Signals $V_3$ and $V_4$ appearing at the inputs of amplifiers 15 and 23, respectively, are the speed control signals. Potentiometers 1 and 13 are adjusted to provide a signal level $V_3$ corresponding to a desired motor speed with a maximum level corresponding to a maximum motor speed. Signal $V_3$ is amplified by feedback controlled amplifier 15 whose output is connected to motor speed control circuit 17. When a maximum signal 10 volts, for example, is generated at the input of amplifier 15, the corresponding positive signal received at speed control circuit 17 produces maximum speed upon motor 19 for the speed control of circuit.

Similarly, the signal $V_4$ is applied to inverting feedback controlled amplifier 23. A current amplifier 25 connected to the output of amplifier 23 connects the amplified signal to capacitor 27 through diode $D_1$ and charging resistance 29. Capacitor 27 is allowed to discharge through potentiometer 31 and diode $D_2$ when the voltage level $V_4$ becomes less positive causing a lower voltage at the output of amplifier 23 and across capacitor 27. The signal across resistance 31 caused by a discharge of capacitor 27, produces a braking signal at the input of braking control 33, which then produces a corresponding mechanical braking force through brake 21 on motor 19, bringing the motor from its over speed condition to the desired speed.

Where the maximum speed signal $V_3$ is 10 volts, for example, the values of resistances 3, 5, 7, and 11 may be 50 K each. $V_1$ may be 100 volts and $V_2$ may be $-80$ volts. The potentiometers 1 and 13 are ganged together so that the ratios of the absolute values of the voltages $V_2/V_1$ would be approximately 0.8. The time constants of the charging circuit comprising capacitor 27 and resistors 29 and a discharge circuit comprising the capacitor 27 and potentiometer 31 would be a function of the mechanical time constants of the system and would be adjusted accordingly.

OPERATION

Potentiometers 1 and 13 are adjusted to give a signal $V_3$ between 0 and 10 volts, corresponding to the desired motor speed. This positive signal appearing at $V_3$ is amplified by amplifier 15 and applied to the motor speed control circuit 17 which may be an SCR device to control the electrical power to motor 19. When the motor is running at the desired set speed, tachometer 10 is mechanically connected to motor 19 and generates a signal $V_t$ corresponding to the set speed. When the motor is running at the set speed or at higher speeds, signal level $V_4$ is produced at the input of amplifier 23. This steady state signal is amplified by unity negative gain amplifier 23, applied to current amplifier 25 and across capacitance 27 through charging resistance 29. When the motor is running at its steady state speed capacitance 27 is charged to a voltage corresponding to the steady state signal $V_3$.

If an under speed condition results the voltage $V_t$ produced at tachometer 10 will become less negative causing voltage level $V_3$ to become more positive, rising above the desired steady state speed signal. This increased voltage amplified by amplifier 15 and applied to motor control circuit 19 will cause the motor 19 to increase its speed. As motor 19 increases its speed, the voltage generated in tachometer 10 will increase becoming more negative, thereby decreasing the positive voltage $V_3$ and reducing the motor speed to the desired steady state speed. During the interval the motor speed was below the steady state value, voltage $V_4$ is held constant by the source comprising $E_2$ and potentiometer 13, and the voltage charge $V_c$ across capacitor 27 remains constant.

However, should an over speed condition develop, the voltage $V_t$ appearing across tachometer 10 will become more negative. This increased negative tachometer voltage causes voltage level $V_4$ to decrease, becoming less positive. This decreased voltage is then amplified by negative gain amplifier 23 and current amplifier 25, resulting in a smaller voltage appearing across capacitance 27. Capacitance 27, experiencing the decreased voltage level discharges through potentiometer 31 and diode $D_2$ producing a small voltage $V_B$ across potentiometer 31 and at the input of braking control circuit 33. The mechanical brake 21 connected to brake control circuit 33 is actuated in proportionate response to signal $V_{B'}$, bringing the speed of the motor 19 from its over speed back condition to its desired speed. When the motor reaches its desired speed, the voltage $V_t$ of tachometer 10 is once again at its steady state value as is voltage level $V_4$, applied to amplifier 23 and applied across capacitance 27, bringing the voltage level $V_c$ across capacitor 27, back to its steady state value and replacing the charge lost when the braking speed signal was applied.

As is well known in the art, the values of the resistances chosen for the voltage divider circuit (i.e., resistances 3, 5, 7, 9 and 11) can be varied to produce the desired signal levels at the inputs to amplifiers 15 and 23. Similarly, the type and gain of each amplifier and the voltage levels of the inventive concept disclosed.

Obviously many modifications and variations of the present invention are possible in the light of the above teachings. It is therefore to be understood that within the scope of the appended claims the invention may be practiced otherwise than as specifically described.

What is claimed is:

1. A motor speed controller comprising:
   means to generate a predetermined signal amplitude level corresponding to a desired motor speed;
   means for generating a speed signal;
   means responsive to said predetermined signal and said speed signal to produce an output signal;
   means for applying a driving force to said motor when said output signal deviates from said predetermined amplitude level in a first direction;
   means responsive to said output signal for applying a braking force to the motor when said output signal amplitude deviates from said predetermined signal amplitude level in a second direction;
   wherein said deviating signals and said predetermined signal amplitude corresponding to the desired motor speed are of same polarity;
   said means for applying a braking force includes a capacitor means for storing said predetermined signal amplitude corresponding to said desired motor speed amplitude signal;
   a discharge path connected to said capacitor, said discharge path including a resistive means;
   a charging path connected between said capacitor means and said means to generate a predetermined signal;
   said capacitor means discharging through said resistive means in said discharge path to produce a braking signal when said motor increases in speed above said set speed, said braking signal being proportional to the difference between the predetermined signal level and the said signal deviation in the said first direction; and
   a braking means connected to said resistive means and responsive to said braking signal to control the speed of the motor.

2. The controller of claim 1, wherein:
   said means to generate a signal includes a positive voltage source and a negative voltage source; and
   said positive and said negative sources being connected to each other through a voltage divider network to produce said signal level corresponding to said desired motor speed.

3. The controller of claim 2, wherein:
   said means for generating a speed signal includes a tachometer connected to said voltage divider network and mechanically connected to said motor to produce a feedback signal corresponding to the actual motor speed;

said tachometer signal combining with said sources across said divider network to produce a signal deviation in said second direction when said motor is in an overspeed condition; and said tachometer signal combining with said sources across said divider network for producing a signal deviation in said first direction when said motor is in an underspeed condition.

4. The controller of claim 3, wherein:

said tachometer is connected to said positive source through a first pair of resistors, and said underspeed signal is generated at the common connection of said resistors;

said tachometer being connected to said negative source by a second pair of resistances, and said overspeed signal is generated at the common connection of said resistors; and a third resistance, connected from said positive source to the common connection of said second pair.

5. The controller of claim 4, wherein said capacitor has first and second terminals;

said first terminal is connected to said connections of said third resistor with said common connection of said second pair.

6. The controller of claim 5, wherein:

said second terminal of said capacitor is connected to said capacitor discharge and charging paths;

said discharging path includes a first resistor connected to said capacitor and ground and said charging path includes a second resistor connected to said capacitor and ground;

said second resistor having a lower resistance than said first resistance;

said charging path including a diode inserted with said charging resistance permitting said capacitor to charge and preventing said capacitor from discharging;

said discharging resistor having a diode connected in series for permitting said capacitor to discharge through said discharging resistance when said motor increases in speed above said desired speed producing a signal deviation in said first direction.

* * * * *